US012592015B2

(12) United States Patent
Wang et al.

(10) Patent No.: US 12,592,015 B2
(45) Date of Patent: Mar. 31, 2026

(54) PREDICTING SCATTERED SIGNAL OF X-RAY, AND CORRECTING SCATTERED BEAM

(71) Applicant: Siemens Shanghai Medical Equipment Ltd., Shanghai (CN)

(72) Inventors: Yang Wang, Shanghai (CN); Rui Kang Zhang, Shanghai (CN); Kai Chen, Shanghai (CN); Yi Tian, Shanghai (CN)

(73) Assignee: Siemens Shanghai Medical Equipment Ltd., Shanghai (CN)

( * ) Notice: Subject to any disclaimer, the term of this patent is extended or adjusted under 35 U.S.C. 154(b) by 390 days.

(21) Appl. No.: 18/262,849

(22) PCT Filed: Sep. 15, 2021

(86) PCT No.: PCT/CN2021/118560
§ 371 (c)(1),
(2) Date: Jul. 25, 2023

(87) PCT Pub. No.: WO2022/160735
PCT Pub. Date: Aug. 4, 2022

(65) Prior Publication Data
US 2024/0312076 A1 Sep. 19, 2024

(30) Foreign Application Priority Data
Jan. 27, 2021 (CN) .......................... 202110110542.4

(51) Int. Cl.
*G06T 12/10* (2026.01)

(52) U.S. Cl.
CPC ........ *G06T 12/10* (2026.01); *G06T 2211/441* (2023.08)

(58) Field of Classification Search
CPC ............. G06T 11/005; G06T 2211/441; G06T 2207/20084; G06T 11/008; G06N 3/04; G06N 3/08
(Continued)

(56) References Cited

U.S. PATENT DOCUMENTS

2012/0263360 A1 10/2012 Zhu et al.
2019/0005686 A1* 1/2019 Liu ........................ G16H 40/63
(Continued)

FOREIGN PATENT DOCUMENTS

CN 108606805 A 10/2018
CN 109717891 A 5/2019
(Continued)

OTHER PUBLICATIONS

Jan. 11, 2022 (PCT) International Search Report and Written Opinion—App. PCT/CN2021/118560.

*Primary Examiner* — Jennifer Mehmood
*Assistant Examiner* — Pardis Sohraby
(74) *Attorney, Agent, or Firm* — Banner & Witcoff, Ltd.

(57) ABSTRACT

A method for predicting a scattered signal of an X-ray for an examination object includes: scanning each phantom in a scanning manner in which a scattering degree of each phantom in a plurality of phantoms is less than a reference scattering degree, so as to obtain first projection data of each phantom; scanning each phantom in a scanning manner in which the scattering degree of each phantom in the plurality of phantoms is equal to the reference scattering degree, so as to obtain second projection data of each phantom; obtaining a real scattered signal of each phantom by subtracting the first projection data of the phantom from the second projection data of the phantom; training a learning model based on the second projection data of each phantom and the real scattered signal of each phantom to obtain a trained learning (Continued)

S100
Scan each phantom in a scanning manner in which a scattering degree of each phantom in a plurality of phantoms is less than a reference scattering degree, so as to obtain first projection data of each phantom.

S101
Scan each phantom in a scanning manner in which the scattering degree of each phantom in the plurality of phantoms is equal to the reference scattering degree, so as to obtain second projection data of each phantom.

S102
Obtain a real scattered signal of each phantom by subtracting the first projection data of each phantom from the second projection data of each phantom.

S103
Train a learning model based on the second projection data of each phantom and the real scattered signal of each phantom to obtain a trained learning model.

S104
Apply the trained learning model to projection data of the X-ray for the examination object to predict the scattered signal in the projection data of the X-ray.

model; and applying the trained learning model to projection data of the X-ray for the examination object to predict the scattered signal of the projection data of the X-ray.

11 Claims, 8 Drawing Sheets

(58) Field of Classification Search
USPC ............................................................ 382/131
See application file for complete search history.

(56) References Cited

U.S. PATENT DOCUMENTS

| | | | |
|---|---|---|---|
| 2020/0170607 A1 | 6/2020 | Yu et al. | |
| 2020/0234471 A1 | 7/2020 | Lu et al. | |
| 2020/0281555 A1 | 9/2020 | Tsuyuki | |
| 2020/0327672 A1* | 10/2020 | Yao | A61B 6/032 |
| 2020/0342637 A1 | 10/2020 | Zhang et al. | |

FOREIGN PATENT DOCUMENTS

| | | | | |
|---|---|---|---|---|
| CN | 111833410 A | 10/2020 | | |
| EP | 3683771 A1 | 7/2020 | | |
| JP | 2012055393 A | * 3/2012 | | A61B 6/583 |

* cited by examiner

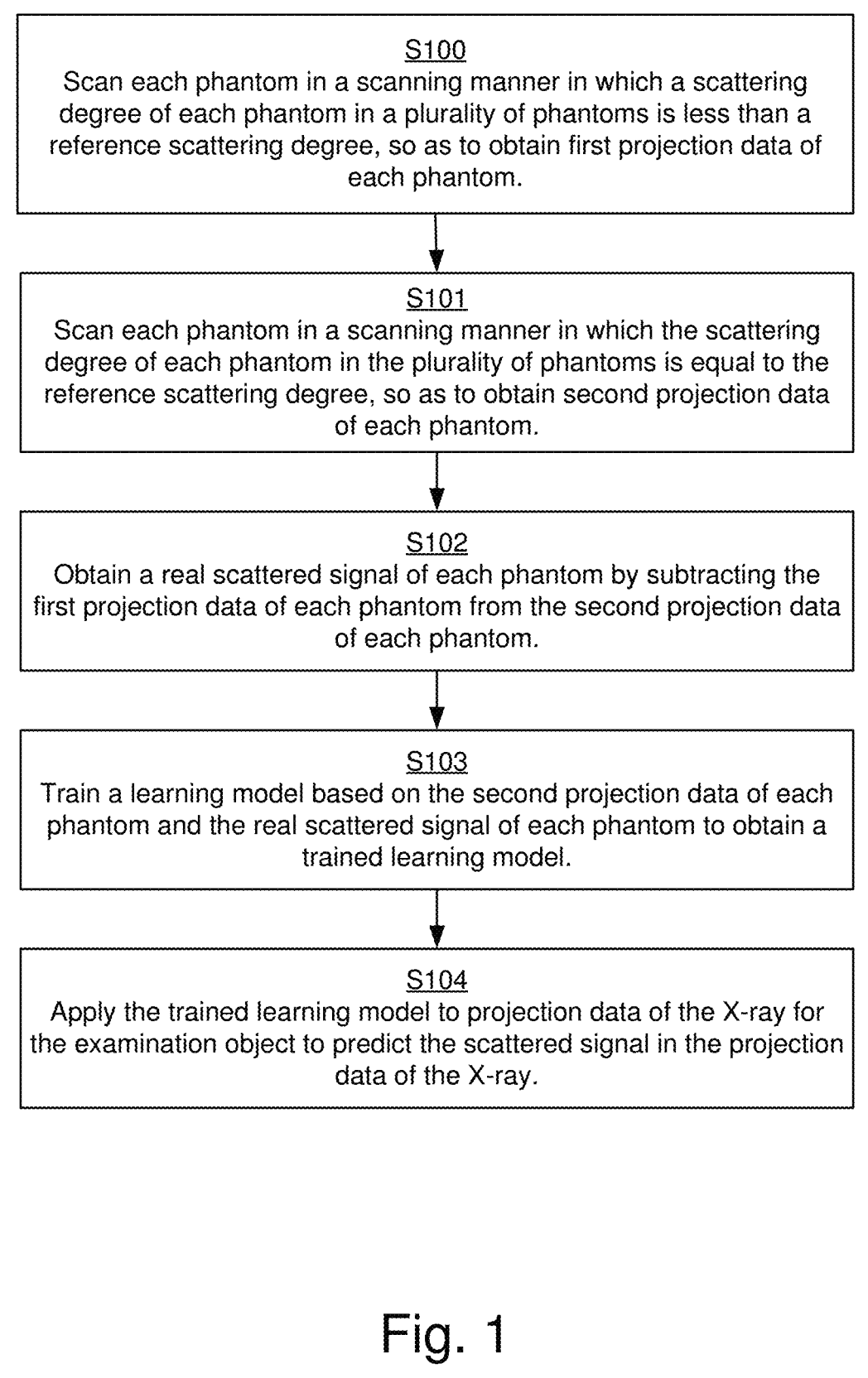

S100
Scan each phantom in a scanning manner in which a scattering degree of each phantom in a plurality of phantoms is less than a reference scattering degree, so as to obtain first projection data of each phantom.

S101
Scan each phantom in a scanning manner in which the scattering degree of each phantom in the plurality of phantoms is equal to the reference scattering degree, so as to obtain second projection data of each phantom.

S102
Obtain a real scattered signal of each phantom by subtracting the first projection data of each phantom from the second projection data of each phantom.

S103
Train a learning model based on the second projection data of each phantom and the real scattered signal of each phantom to obtain a trained learning model.

S104
Apply the trained learning model to projection data of the X-ray for the examination object to predict the scattered signal in the projection data of the X-ray.

Fig. 1

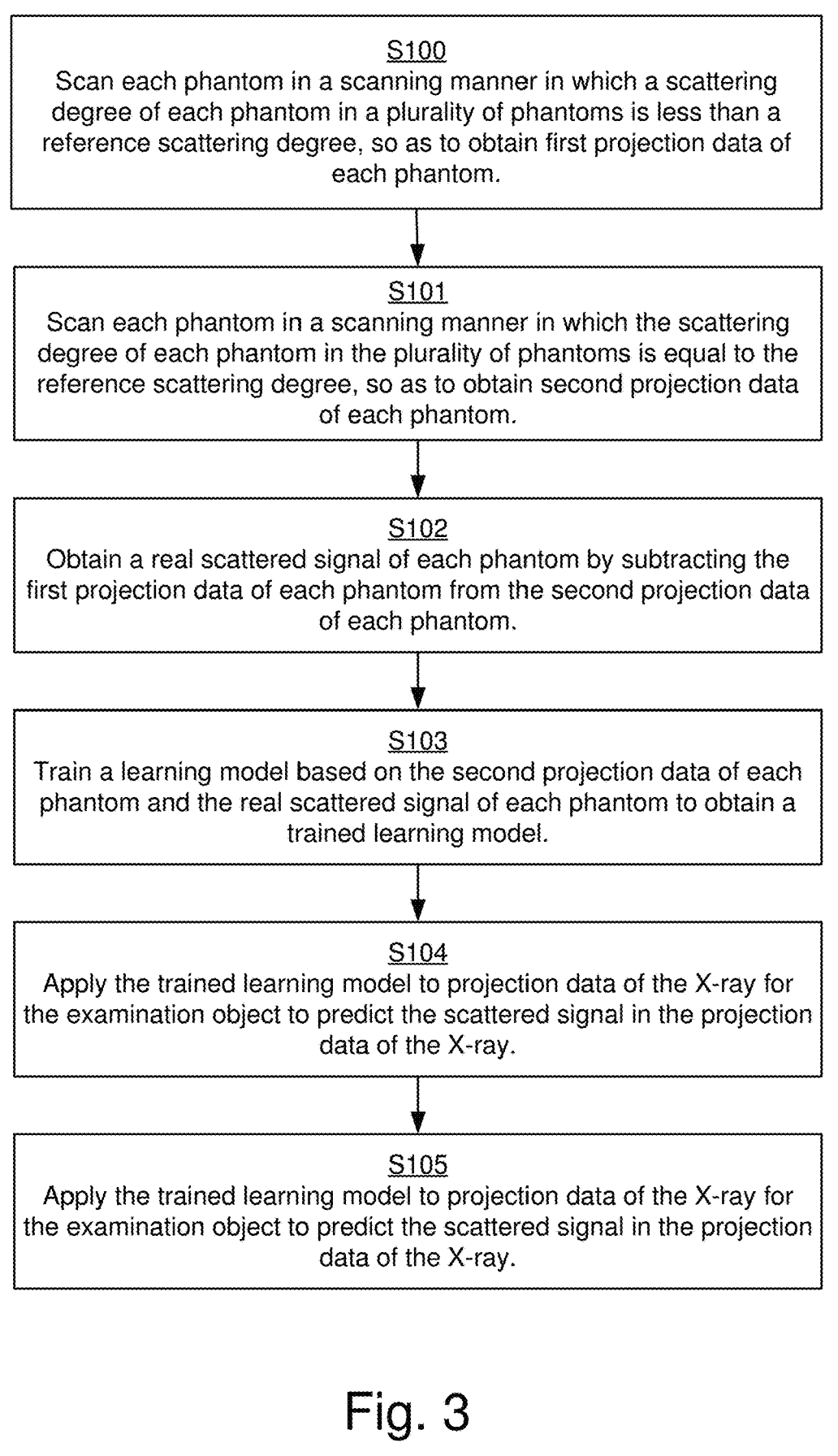

S100
Scan each phantom in a scanning manner in which a scattering degree of each phantom in a plurality of phantoms is less than a reference scattering degree, so as to obtain first projection data of each phantom.

S101
Scan each phantom in a scanning manner in which the scattering degree of each phantom in the plurality of phantoms is equal to the reference scattering degree, so as to obtain second projection data of each phantom.

S102
Obtain a real scattered signal of each phantom by subtracting the first projection data of each phantom from the second projection data of each phantom.

S103
Train a learning model based on the second projection data of each phantom and the real scattered signal of each phantom to obtain a trained learning model.

S104
Apply the trained learning model to projection data of the X-ray for the examination object to predict the scattered signal in the projection data of the X-ray.

S105
Apply the trained learning model to projection data of the X-ray for the examination object to predict the scattered signal in the projection data of the X-ray.

Fig. 3

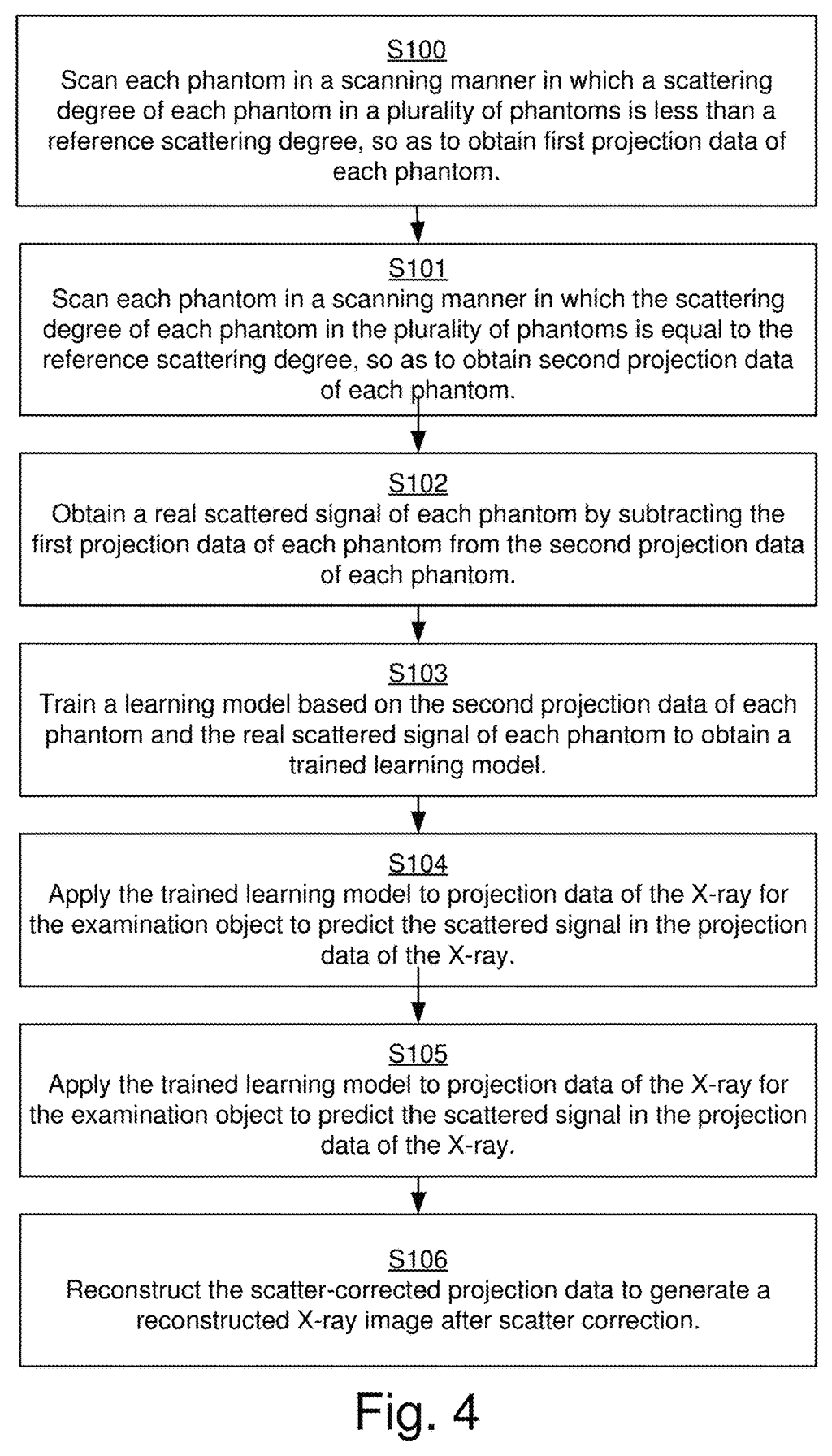

S100
Scan each phantom in a scanning manner in which a scattering degree of each phantom in a plurality of phantoms is less than a reference scattering degree, so as to obtain first projection data of each phantom.

↓

S101
Scan each phantom in a scanning manner in which the scattering degree of each phantom in the plurality of phantoms is equal to the reference scattering degree, so as to obtain second projection data of each phantom.

↓

S102
Obtain a real scattered signal of each phantom by subtracting the first projection data of each phantom from the second projection data of each phantom.

↓

S103
Train a learning model based on the second projection data of each phantom and the real scattered signal of each phantom to obtain a trained learning model.

↓

S104
Apply the trained learning model to projection data of the X-ray for the examination object to predict the scattered signal in the projection data of the X-ray.

↓

S105
Apply the trained learning model to projection data of the X-ray for the examination object to predict the scattered signal in the projection data of the X-ray.

↓

S106
Reconstruct the scatter-corrected projection data to generate a reconstructed X-ray image after scatter correction.

Fig. 4

PREDICTING SCATTERED SIGNAL OF X-RAY, AND CORRECTING SCATTERED BEAM

TECHNICAL FIELD

This application generally relates to the technical field of computerized tomography (CT) projection signal correction and image processing, and more specifically, to a method for predicting a scattered signal of an X-ray based on a learning technology.

BACKGROUND

Computerized tomography (CT) has been widely used in medical image fields. However, because scattered radiation is an intrinsic X-ray characteristic, scattered radiation rays that affect image quality are inevitably generated in a process of X-ray imaging of computerized tomography (CT). Scattered radiation rays deteriorate image quality in CT imaging.

Usually, a CT system uses an anti-scatter grid (ASG) on detector hardware to reduce impact from a scattered signal. However, with use of an increasingly wide detector and pressure of hardware costs, CT manufacturers are more intended to calibrate the scattered signal by using a software algorithm.

Various scatter correction algorithms and methods have been developed based on analysis models, which typically have more or less high calculation complexity, for example, some scatter correction algorithms and methods need to be simulated via iterative processes or statistics, such as Monte Carlo simulation. Scatter correction algorithms and methods developed based on analysis models, such as a Monte Carlo simulation-based algorithm, usually have high calculation complexity and require iterative processes and thus require much calculation and are therefore not widely used.

In the current CT system, a convolution kernel algorithm based only on the raw data has been used, which is a simple and efficient scatter correction algorithm that does not involve an iterative method. However, the algorithm has a relatively strong model dependence and is difficult to extend for wider application. When contribution of scattered radiation becomes larger and scanning conditions become more complex, the current convolution kernel scatter correction algorithm is unable to predict a suitable scattered signal for all cases.

In addition, convolution kernel design and modeling work is a key point of the current scatter correction algorithm, and is used to estimate distribution of scattering after coming out of an object scanned by an X-ray and reaching a detector. Each new system type usually needs to rely on simulation of system attributes and measurement of specified scattered signals from a representative phantom scanned under different scanning conditions. Then, based on the simulated and measured data, the convolution kernel is designed and model parameters are adjusted. For systems with a relatively large scattering contribution, more complex models must be applied to compensate for scattering effects for different situations.

SUMMARY

A main objective of this application is to train a learning model by using real scattered signals of a phantom scanned under different scanning conditions and scatter fading data of an entire phantom obtained under different scanning conditions by using a standard clinical scanning width (that is, a reference scanning width mentioned in the following) as training data, so as to predict a corresponding scattered signal according to different scanning conditions (different object fading structures, different object positions, and different scanning powers (for example, kV)), so that a limitation that only a limited convolution kernel in a current convolution kernel algorithm can be used to predict a fixed scattered signal is removed, and more accurate scatter correction results can be obtained.

To achieve the foregoing objective, according to one aspect of this application, a method for predicting a scattered signal of an X-ray for an examination object is provided and includes: scanning each phantom in a scanning manner in which a scattering degree of each phantom in a plurality of phantoms is less than a reference scattering degree, so as to obtain first projection data of each phantom: scanning each phantom in a scanning manner in which the scattering degree of each phantom in the plurality of phantoms is equal to the reference scattering degree, so as to obtain second projection data of each phantom: obtaining a real scattered signal of each phantom by subtracting the first projection data of the phantom from the second projection data of the phantom: training a learning model based on the second projection data of each phantom and the real scattered signal of each phantom to obtain a trained learning model; and applying the trained learning model to projection data of the X-ray for the examination object to predict the scattered signal in the projection data of the X-ray.

In this specification, the reference scattering degree refers to a scattering degree generated by scanning a phantom in a standard clinical mode. In this manner, scatter-free projection data of a phantom is obtained by scanning the phantom in a scanning manner in which contribution of a scattered signal is so small and can be neglected. Scattered projection data of the phantom is obtained by scanning the phantom in a standard clinical mode. A real scattered signal of the phantom is obtained by subtracting the scattered projection data from the scatter-free projection data. The learning model is trained based on the real scattered signal of the phantom and the projection data under standard scanning of the phantom. All data used for training is measurement data of the phantom, that is, actual measurement data. Therefore, compared with a method for training a learning model based on analog data in the prior art, a more accurate scattered signal of projection data of an X-ray can be obtained.

In addition, a data processing process of this application is not directly applied to an image, and therefore an image of an object does not need to be scanned. Therefore, the foregoing method has no impact on a structure of a current data processing pipeline, and all other calibration or correction steps (for correcting an effect of a system or a detector, etc.) remain the same. In addition, in the prior art, a method for performing scatter estimation according to an image generally has little or even no physical evidence. Therefore, it is difficult to control image quality (artifact or image noise). In contrast, in this application, performing scatter prediction according to projection data can avoid the foregoing problem.

Further, according to an embodiment of this application, the training a learning model based on the second projection data of each phantom and the real scattered signal of each phantom to obtain a trained learning model includes: performing pre-calculation processing on the second projection data of each phantom based on a physical model to obtain a calculated scattered signal of each phantom; and training the learning model by using the calculated scattered signal of each phantom and the real scattered signal of each phantom as training data.

In this manner, because the second projection data of each phantom is preprocessed based on the physical model, more physical evidence can be obtained in a scattered signal prediction process, thereby controlling image quality more easily.

Further, according to an embodiment of this application, the calculated scattered signal of each phantom is used as input training data of the learning model, and the real scattered signal of each phantom is used as output training data of the learning model to train the learning model.

In this manner, the calculated scattered signal is still calculated from the physical model with a calibration pre-processing program, so that the learning model is only used to learn real distribution of the generated scattered radiation on a specific system, thereby reducing learning complexity.

Further, according to an embodiment of this application, the scanning each phantom in a scanning manner in which a scattering degree of each phantom in a plurality of phantoms is less than a reference scattering degree, so as to obtain first projection data of each phantom includes: performing segmented scanning on each of the plurality of phantoms with a first width less than a reference scanning width under a plurality of different scanning conditions to collect projection data of each first segment of each phantom with the first width under each scanning condition, where the reference scanning width is a width used when standard clinical scanning is performed; and obtaining the first projection data of each phantom under each scanning condition by connecting the projection data of each first segment of each phantom collected under each scanning condition.

In this manner, the scatter-free projection data of the phantom can be obtained by performing segmented scanning on the phantom. For example, for a certain phantom, a small collimator width is first used to collect a signal, which may be considered as a scatter-free real signal, and a small collimator is moved to collect all signals in a range of a detector. Then, scatter-free projection data of the entire phantom can be obtained by connecting signals collected by using each small collimator width. In this way, precision of scatter-free projection data can be improved by controlling a collection width, so that suitable scatter-free projection data can be obtained. In addition, in this manner, specific scattered signals under different scanning conditions (different object fading structures, different object positions, and different scanning powers (kV)) can be predicted, so that a model obtained after learning training can compensate for scattering effects under different scanning conditions, and is also applicable to an existing CT system.

Further, according to an embodiment of this application, the scanning each phantom in a scanning manner in which the scattering degree of each phantom in the plurality of phantoms is equal to the reference scattering degree, so as to obtain second projection data of each phantom includes: scanning each of the plurality of phantoms with the reference scanning width under the plurality of different scanning conditions to collect the second projection data of each phantom under each scanning condition.

In this manner, for example, by collecting a signal (in a typical clinical mode) with a large collimator width for a certain phantom, required scattered projection data can be obtained by controlling the collection width according to a type of and an application a CT image system, thereby simplifying calculation complexity.

Further, according to an embodiment of this application, the first projection data of each phantom and the second projection data of each phantom refer to distribution of absorption coefficients collected from each phantom.

In this manner, the image of the object does not need to be scanned in the data processing process. Therefore, this does not affect the structure of the current data processing pipeline, and all other calibration or correction steps remain the same.

Further, according to an embodiment of this application, the physical model is $\delta = \gamma \cdot T_0 \cdot \exp(-\kappa \cdot T)$, $\delta$ is the calculated scattered signal, T is a total absorption coefficient on the entire X-ray scanning path, $T_0$ is an absorption coefficient of each phantom, and $\kappa$ and $\gamma$ are model fitting parameters.

In this manner, a calculated scattered signal with more physical evidence can be obtained, thereby improving prediction accuracy.

Further, according to an embodiment of this application, the learning model includes machine learning with different network types and deep learning.

In this manner, the method in this application may use various learning methods to perform scatter prediction, and any learning technology may be used in the method proposed in this application, for example, machine learning with different network types and deep learning such as a convolutional neural network.

Further, according to an embodiment of this application, the plurality of different scanning conditions include at least one of the following: different phantom fading structures, different phantom positions, and different scanning powers.

In this manner, even if the scanning conditions are complex and diverse, suitable scattered signals can be predicted for all cases.

According to another aspect of this application, an apparatus for predicting a scattered signal of an X-ray for an examination object is further provided and includes: a first obtaining module, configured to scan each phantom in a scanning manner in which a scattering degree of each phantom in a plurality of phantoms is less than a reference scattering degree, so as to obtain first projection data of each phantom: a second obtaining module, configured to scan each phantom in a scanning manner in which the scattering degree of each phantom in the plurality of phantoms is equal to the reference scattering degree, so as to obtain second projection data of each phantom: a subtraction module, configured to obtain a real scattered signal of each phantom by subtracting the first projection data of the phantom from the second projection data of the phantom: a training module, configured to train a learning model based on the second projection data of each phantom and the real scattered signal of each phantom to obtain a trained learning model; and a prediction module, configured to apply the trained learning model to projection data of the X-ray for the examination object to predict the scattered signal in the projection data of the X-ray.

In this manner, the learning model is trained based on the real scattered signal of the phantom and the projection data of the phantom in the standard clinical mode. Therefore, because data used for training is measurement data of the phantom, that is, actually measured data, a more accurate scattered signal of the projection data of the X-ray can be obtained compared with a method for training a learning model based on analog data in the prior art.

According to still another aspect of this application, a method for correcting a scattered beam of an X-ray for an examination object is provided and includes: scanning each phantom in a scanning manner in which a scattering degree of each phantom in a plurality of phantoms is less than a reference scattering degree, so as to obtain first projection data of each phantom: scanning each phantom in a scanning manner in which the scattering degree of each phantom in the plurality of phantoms is equal to the reference scattering degree, so as to obtain second projection data of each phantom: obtaining a real scattered signal of each phantom by subtracting the first projection data of the phantom from the second projection data of the phantom: training a learning model based on the second projection data of each phantom and the real scattered signal of each phantom to obtain a trained learning model: applying the trained learning model to projection data of the X-ray for the examination object to predict the scattered signal in the projection data of the X-ray; and correcting the projection data of the X-ray for the examination object by using the predicted scattered signal to generate scatter-corrected projection data.

In this manner, the learning model is trained based on the real scattered signal of the phantom and the projection data of the phantom in the standard clinical mode. Therefore, because data used for training is measurement data of the phantom, that is, actually measured data, a more accurate scattered signal of the projection data of the X-ray can be obtained and the scattered signal of the X-ray for the examination object can be more correctly corrected compared with a method for training a learning model based on analog data in the prior art.

According to still another aspect of this application, a method for reconstructing an image of an X-ray for an examination object is provided and includes: scanning each phantom in a scanning manner in which a scattering degree of each phantom in a plurality of phantoms is less than a reference scattering degree, so as to obtain first projection data of each phantom: scanning each phantom in a scanning manner in which the scattering degree of each phantom in the plurality of phantoms is equal to the reference scattering degree, so as to obtain second projection data of each phantom: obtaining a real scattered signal of each phantom by subtracting the first projection data of the phantom from the second projection data of the phantom: training a learning model based on the second projection data of each phantom and the real scattered signal of each phantom to obtain a trained learning model: applying the trained learning model to projection data of the X-ray for the examination object to predict the scattered signal in the projection data of the X-ray: correcting the projection data of the X-ray for the examination object by using the predicted scattered signal to generate scatter-corrected projection data; and reconstructing the scatter-corrected projection data to generate a reconstructed computerized tomography image after scatter correction.

In this manner, the learning model is trained based on the real scattered signal of the phantom and the projection data of the phantom in the standard clinical mode. Therefore, because data used for training is measurement data of the phantom, that is, actually measured data, a more accurate scattered signal in the projection data of the X-ray can be obtained compared with a method for training a learning model based on analog data in the prior art, thereby improving quality of a reconstructed X-ray image.

According to still another aspect of this application, a computer storage medium storing a program is provided. When being executed, the program causes a computer to perform the foregoing method.

In the embodiments of this application, a learning model is trained by using real scattered signals of a phantom scanned under different scanning conditions and scatter fading data of an entire phantom obtained under different scanning conditions by using a standard clinical scanning width as training data, so as to predict a specific scattered signal according to different scanning conditions (different object fading structures, different object positions, and different scanning powers (for example, kV)), so that more accurate scatter correction results can be obtained. In the data processing process of this application, image data of a scanned object does not need to be used. Therefore, the foregoing method does not need an additional iterative processing process and has no impact on a structure of a current data processing pipeline, and all other calibration or correction steps (for correcting an effect of a system or a detector, etc.) remain the same. In addition, in this application, scatter prediction is performed according to projection data, which can avoid image quality problems such as artifacts.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation to this application. In the accompany drawings:

FIG. 1 is a flowchart of a method for predicting a scattered signal of an X-ray for an examination object according to an embodiment of this application.

FIG. 3 is a flowchart of a method for correcting a scattered beam of an X-ray for an examination object according to an embodiment of this application.

FIG. 4 is a flowchart of a method for reconstructing an image of an X-ray for an examination object according to an embodiment of this application.

DETAILED DESCRIPTION

Figure 2:
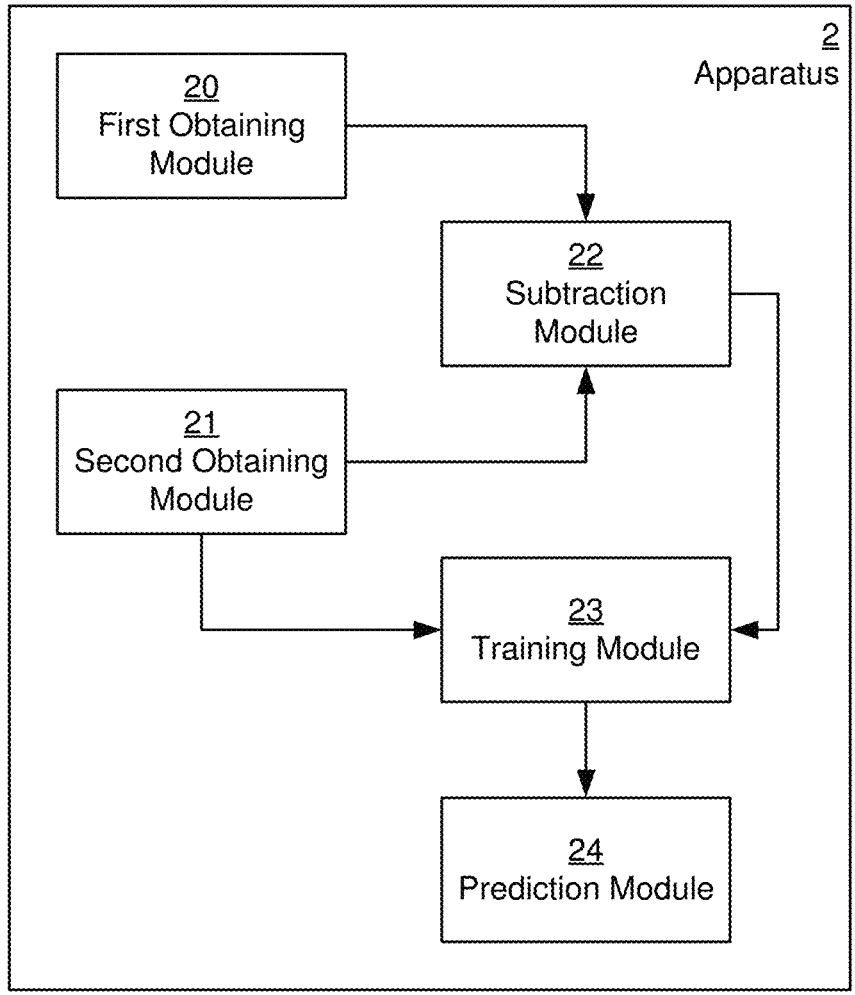
FIG. 2 is a block diagram of an apparatus for predicting a scattered signal of an X-ray for an examination object according to an embodiment of this application.

It should be noted that the embodiments in this application and the features in the embodiments may be combined with each other in case of no conflicts. This application is described in detail below with reference to the drawings and the embodiments.

It should be noted that, unless otherwise specified, all technical and scientific terms used herein have the same meaning as commonly understood by a person of ordinary skill in the art to which this application belongs.

In this application, unless otherwise specified, orientation terms such as "up, down, top, and bottom" are generally used based on a direction shown in the accompanying drawings, or generally defined based on a vertical, perpendicular, or gravity direction; and similarly, for ease of understanding and description, "inside and outside" refer to inside and outside relative to a profile of a component. However, the foregoing orientation terms are not intended to limit this application.

FIG. 1 is a flowchart of a method for predicting a scattered signal of an X-ray for an examination object according to an embodiment of this application. As shown in FIG. 1, the method for predicting a scattered signal of an X-ray for an examination object includes:

Step S100: Scan each phantom in a scanning manner in which a scattering degree of each phantom in a plurality of phantoms is less than a reference scattering degree, so as to obtain first projection data of each phantom.

In this step, the reference scattering degree refers to a scattering degree generated by scanning a phantom in a standard clinical mode, so that each phantom in the plurality of phantoms is scanned in the scanning manner in which the scattering degree of each phantom is less than the reference scattering degree, and a contribution of the scattered signal of the phantom is so small and can be neglected relative to absorption of the phantom. For example, a scattering amount of the phantom is 0.01 times of an absorption amount of the phantom. That is, scattering in projection data obtained when the scattering degree of the phantom is less than the reference scattering degree has no impact on image quality and does not need to be considered. Correspondingly, the first projection data may refer to projection data that can be considered as scatter-free projection data for the entire phantom.

Specifically, the scatter-free projection data of the phantom can be obtained by scanning the phantom in such a manner that the scattering degree of the phantom relative to the absorption degree of the phantom is so small and can be neglected. In an implementation, the first projection data of the phantom may be obtained by: performing segmented scanning on each of the plurality of phantoms with a first width less than a reference scanning width under a plurality of different scanning conditions to collect projection data of each first segment of each phantom with the first width under each scanning condition, where the reference scanning width is a width used when standard clinical scanning is performed; and obtaining the first projection data of each phantom under each scanning condition by connecting the projection data of each first segment of each phantom collected under each scanning condition. Different scanning conditions may include different phantom fading structures, different phantom positions, different scanning powers (energy), e.g., scanning kV, etc.

As a specific example, for a certain phantom, a small collimator width (that is, the first width) is first used to collect a signal, which may be considered as a scatter-free real signal, and a small collimator is moved to collect all signals in a range of a detector. Then, scatter-free projection data (that is, the first projection data) of the entire phantom can be obtained by connecting signals collected by using each small collimator width.

Step S101: Scan each phantom in a scanning manner in which the scattering degree of each phantom in the plurality of phantoms is equal to the reference scattering degree, so as to obtain second projection data of each phantom.

In this step, the scattering degree generated when the phantom is scanned is the reference scattering degree generated when standard clinical scanning is performed. Scattering in the projection data of the phantom obtained during this scanning affects final image quality, and therefore cannot be neglected and should be removed. Correspondingly, the second projection data may refer to scattered radiation that is included in the collected projection data and that affects image quality.

In an implementation, each of the plurality of phantoms may be scanned with the reference scanning width under the plurality of different scanning conditions to collect the second projection data of each phantom under each scanning condition. Similarly, different scanning conditions may include different phantom fading structures, different phantom positions, different scanning powers, e.g., scanning kV, etc.

As an instance, second projection data of a certain phantom is obtained by collecting a signal (in a clinically typical mode) with a large collimator width (i.e., a second width).

In this specification, the collimator may be a sheet that is installed behind an X-ray generator of a CT imaging system and is configured to allow only X-rays from a specific direction range to scan and image the phantom, and the first and second projection data of the phantom may be, for example, distribution of absorption coefficients of the phantom under a certain projection. The phantom may be a simple phantom such as a water phantom: a diversified complex model such as a body phantom, for example, a head impersonation phantom or a lung impersonation phantom.

Step S102: Obtain a real scattered signal of each phantom by subtracting the first projection data of each phantom from the second projection data of each phantom. In this step, the real scattered signal refers to a scattered signal value obtained when the phantom is scanned.

Step S103: Train a learning model based on the second projection data of each phantom and the real scattered signal of each phantom to obtain a trained learning model.

Real scattered signal values (e.g., two-dimensional arrays) obtained in step S102 in each projection direction may be used as real values (signal 1) in training of the learning model by scanning diversified complex phantoms. In addition, the projection data of the phantom in each projection direction obtained in step S101 is used as a signal 2. For example, a signal collected with a large collimator width may be used to obtain two-dimensional distribution (signal 2) of the absorption coefficients of the phantom in each projection direction. The learning model is trained based on the signal 1 and the signal 2, and a trained learning model may be obtained to predict a scattered signal of projection data of an X-ray for an examination object (e.g., one or some parts of a human body).

In addition, in step S103, pre-calculation processing may be performed on the second projection data of each phantom based on a physical model to obtain a calculated scattered signal of each phantom; and the learning model is trained by using the calculated scattered signal of each phantom and the real scattered signal of each phantom as training data.

For example, the calculated scattered signal may be a two-dimensional array, the two-dimensional data may be used as an input to the learning model, and the signal 1 also as a two-dimensional array is used as an output of the learning model to perform pairing training on the learning model. In addition, learning algorithms for the learning model are not specifically required, such as but are not limited to, deep learning, such as neural network learning of convolutional neural networks and machine learning. There is also no special requirement for network selection.

As an example, the first projection data of each phantom and the second projection data of each phantom refer to distribution of absorption coefficients collected from each phantom. In other words, in this application, data in the collected projection space is a transmitted X-ray, and each X-ray may be represented by using certain space-related absorption coefficient distribution.

The physical model is $\delta=\gamma\cdot T_0\cdot\exp(-\kappa\cdot T)$, $\delta$ is the calculated scattered signal, T is a total absorption coefficient on the entire X-ray scanning path, $T_0$ is an absorption coefficient of each phantom, and $\kappa$ and $\gamma$ are model fitting parameters.

Figure 5A:
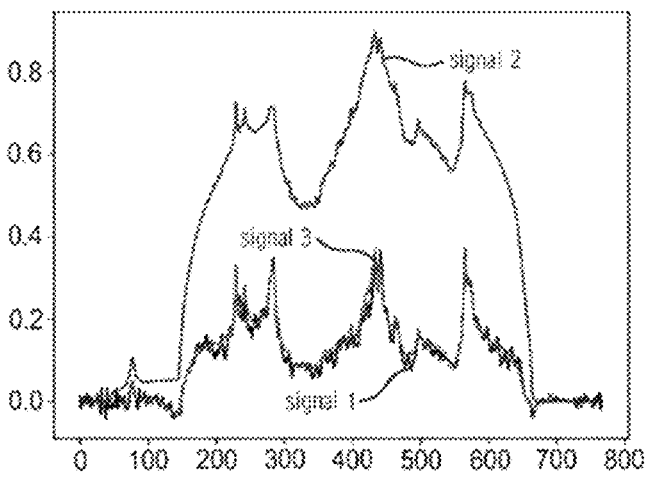
FIG. 5A shows two-dimensional distribution of absorption coefficients of a scanned phantom under a certain projection, a scattered signal that needs to be corrected when a trained learning model is applied to two-dimensional distribution of absorption coefficients of a scanned phantom under a certain projection, and two-dimensional distribution of real scattered signals of a scanned phantom according to an embodiment of this application.

As shown in FIG. 5A, the signal 1 represents the real scattered signal obtained in step S102, and the signal 2 represents two-dimensional distribution of normalized absorption coefficients (that is, corresponding to the second projection data) of a scanned phantom under a certain projection (for brevity and clarity, only distribution of the absorption coefficients in a certain one-dimensional direction is shown), where the learning model may be trained by using the signals 1 and 2. As shown in FIG. 5A, a signal 3 indicates a scattered signal that needs to be corrected when the trained learning model is applied to the signal 2. Therefore, it can be learned that the scattered signal that needs to be corrected when the trained learning model is applied to the signal 2 is basically consistent with the real scattered signal.

Figure 5B:
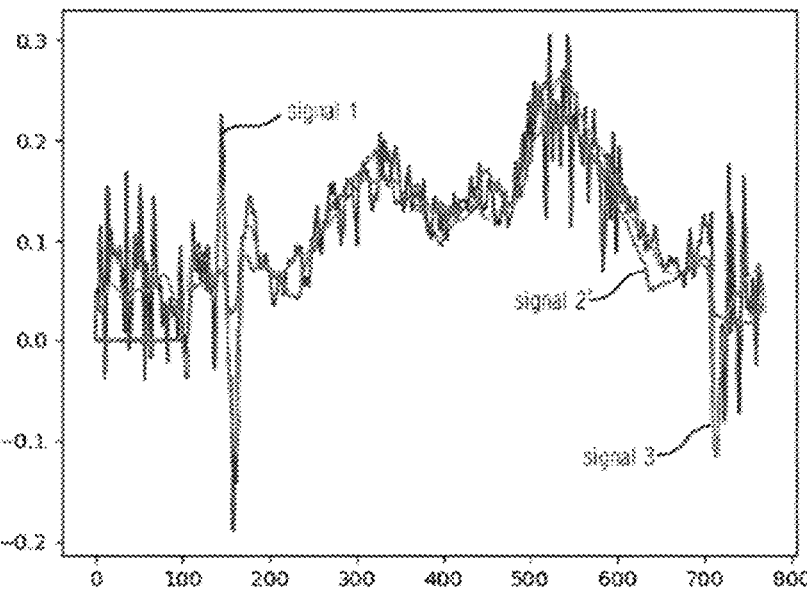
FIG. 5B shows a calculated scattered signal obtained after pre-calculation processing of a physical model is performed on two-dimensional distribution of absorption coefficients of a scanned phantom under a certain projection, a scattered signal that needs to be corrected when a trained learning model is applied to two-dimensional distribution of absorption coefficients of a scanned phantom under a certain projection, and two-dimensional distribution of real scattered signals of a scanned phantom according to an embodiment of this application.

In addition, as shown in FIG. 5B, the learning model may be trained by using the calculated scattered signal (that is, a signal 2' shown in FIG. 5B) generated by performing the foregoing physical model processing on the signal 2, and the signal 1 as training data, to simplify calculation complexity.

Step S104: Apply the trained learning model to projection data of the X-ray for the examination object to predict the scattered signal in the projection data of the X-ray. Specifically, the projection data of the X-ray for the examination object is input into the learning model to generate a scattered signal prediction of the X-ray in the projection space.

In the foregoing method according to this application, scattered projection data and scatter-free projection data may be collected under a plurality of different conditions for various types of complex phantoms (phantoms having different circumferences and heights), so as to provide sufficient and rich training data used to train the learning model, so that the method in this application can be applied to various systems, that is, is system-independent, and can be applied to scatter prediction under various conditions.

The foregoing scatter correction method in this application may also be used in combination with a scattering reduction technology such as an anti-scatter grid.

Corresponding to the method shown in FIG. 1, FIG. 2 shows an apparatus for predicting a scattered signal of an X-ray for an examination object according to an embodiment of this application. The apparatus 2 includes: a first obtaining module 20, configured to scan each phantom in a scanning manner in which a scattering degree of each phantom in a plurality of phantoms is less than a reference scattering degree, so as to obtain first projection data S1 of each phantom: a second obtaining module 21, configured to scan each phantom in a scanning manner in which the scattering degree of each phantom in the plurality of phantoms is equal to the reference scattering degree, so as to obtain second projection data S2 of each phantom: a subtraction module 22, configured to obtain a real scattered signal Sr of each phantom by subtracting the first projection data S1 of the phantom from the second projection data S2 of the phantom: a training module 23, configured to train a learning model based on the second projection data S2 of each phantom and the real scattered signal Sr of each phantom to obtain a trained learning model; and a prediction module 24, configured to apply the trained learning model to projection data of the X-ray for the examination object to predict the scattered signal in the projection data of the X-ray.

Preferably, before the second projection data S2 of each phantom is provided to the training phantom 23, the second projection data S2 may be preprocessed by using a preprocessing module (not shown) by using a physical model, where the physical model may be $\delta=\gamma\cdot T_0\cdot\exp(-\kappa\cdot T)$, $\delta$ is the calculated scattered signal, T is a total absorption coefficient on the entire X-ray scanning path, $T_0$ is an absorption coefficient of each phantom, and $\kappa$ and $\gamma$ are model fitting parameters. Then, the preprocessing phantom provides the calculated scattered signal obtained through physical model processing to the training phantom 23, so that the training phantom 23 trains the learning model by using the real scattered signal of the phantom and the calculated scattered signal of the phantom as the training data input and output.

In addition, it may be understood that the first obtaining module 21 may perform an operation corresponding to the foregoing step S100 described with reference to FIG. 1, the second obtaining module 22 may perform an operation corresponding to the foregoing step S101 described with reference to FIG. 1, the subtraction module 23 may perform an operation corresponding to the foregoing step S102 described with reference to FIG. 1, the training module 23 may perform an operation corresponding to the foregoing step S103 described with reference to FIG. 1, and the prediction module 24 may execute an operation corresponding to the foregoing step S104 described with reference to FIG. 1.

FIG. 3 shows a method for correcting a scattered beam of an X-ray for an examination object according to an embodiment of this application. In this method, steps S100 to S104 are the same as steps S100 to S104 of FIG. 1, and details are not described herein again. In addition, the method further includes step S105: correct the projection data of the X-ray for the examination object by using the predicted scattered signal to generate scatter-corrected projection data. In this step, the scatter-corrected projection data may be generated by subtracting the predicted scattered data from the projection data of the X-ray for the examination object (for example, a certain part of a human body in clinical practice, for example a head or a lung).

FIG. 4 shows a method for reconstructing an image of an X-ray for an examination object according to an embodiment of this application. In this method, steps S100 to S104 are the same as steps S100 to S104 of FIG. 1, step S105 is the same as step S105 of FIG. 3, and details are not described herein again. In addition, the method further includes step S106: reconstruct the scatter-corrected projection data to generate a reconstructed X-ray image after scatter correction.

Figure 6A:
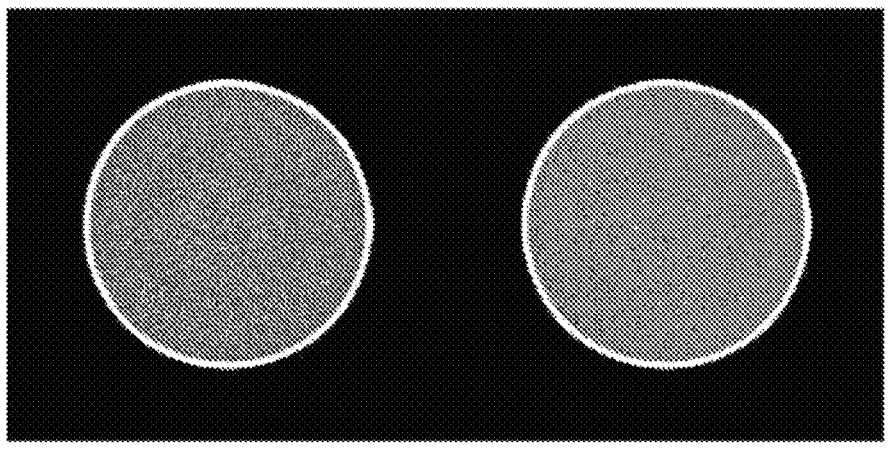
FIG. 6A to FIG. 6E show comparisons between an image constructed by using the method in FIG. 4 in this application and an image obtained by using a currently used clinically verified algorithm in a CT system from aspects of a simple phantom (water phantom), a complex phantom (body phantom), and a real clinical image (head scanning).
Figure 6B:
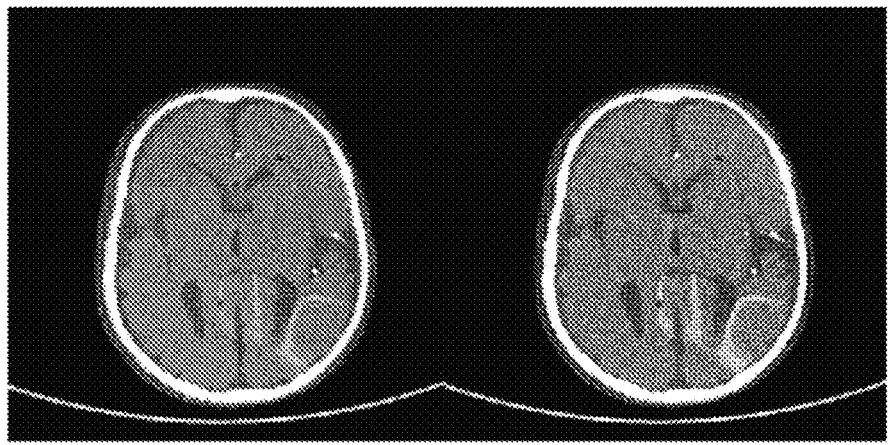
Figure 6C:
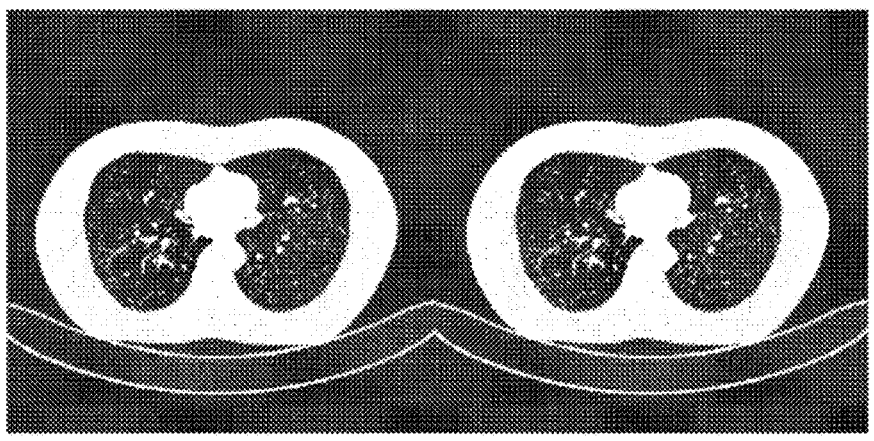
Figure 6D:
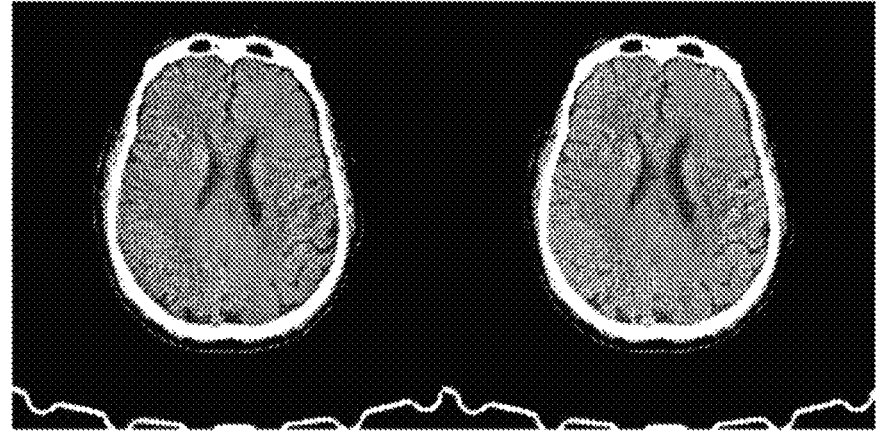
Figure 6E:
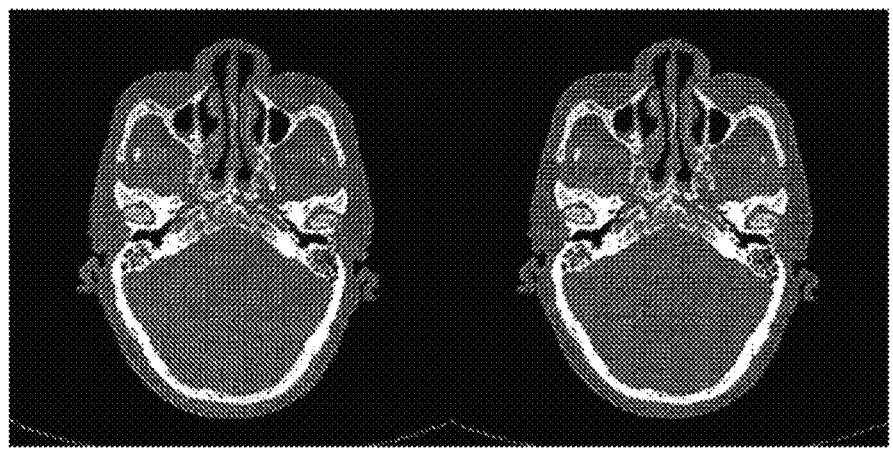

In addition, although the scatter prediction and correction involved in this application are applied to raw data in a certain projection direction, the image constructed based on the method provided in FIG. 4 in this application is compared with an image obtained by using a clinically verified algorithm currently used by a CT system, and it is verified at an image level that a fading drift caused by scattered radiation can be well predicted by the prediction method provided in this application and suitable image quality can be obtained after the scattered signal is removed. FIG. 6A to FIG. 6E respectively verify the method of this application from aspects of a simple phantom (water phantom), a complex phantom (body phantom), and a real clinical image (head scanning). FIG. 6A shows a simple water phantom image, FIG. 6B shows a head impersonation image, FIG. 6C shows a lung impersonation image, FIG. 6D shows a scanned image of a brain window of a head in clinic (a real person), and FIG. 6E shows a scanned image of a bone window of a head in clinic (a real person), where the left part of each figure is obtained by using a deep learning-based convolutional neural network-assisted scatter correction algorithm of this application, and the right part thereof is obtained by using an existing scatter correction algorithm.

It can be learned from the figures that, images obtained by using the algorithm proposed in this application and images obtained by using the currently used clinically verified algorithm of the CT system are very close to each other, and images obtained by using both methods are based on same raw data. In the case of the simple water phantom images shown in FIG. 6A, it can be seen through the comparison between the left and right parts in FIG. 6A that there is no difference in accuracy and uniformity of water values of the images obtained by using the two methods. In the case of the head impersonation images shown in FIG. 6B, it can be seen through comparison between the left and right parts in FIG. 6B that there is no visible difference in contrast, low contrast resolution, tissue shape structure, resolution, and noise level of the images obtained by using the two methods. In the case of the lung impersonation images shown in FIG. 6C, it can be seen through comparison between the left and right parts in FIG. 6C that there is no visible difference in high contrast resolution and tissue shape structure of the images obtained by using the two methods, and no extra artifact is visible in the image reconstructed by using the method in this application. In the case of the scanned image of a brain window of a head in clinic (a real person) shown in FIG. 6D, it can be seen through comparison between the left and right parts in FIG. 6D that there is no obvious difference in contrast (grey matter contrast), low contrast resolution, noise level, and tissue shape structure of the images obtained by using the two methods, and no artifact is visible in the image reconstructed by using the method in this application. In the case of the scanned image of a bone window of a head in clinic (a real person) shown in FIG. 6E, it can be seen through comparison between the left and right parts in FIG. 6E that the images obtained by using the two methods are not different in high contrast resolution (at an inner ear), image form details are consistent, and no artifact is visible in the image reconstructed by using the method in this application.

It can be learned from verification at the image level that quality of the X-ray image reconstructed in the manner in this application is similar to that of the image obtained by using the currently used clinically verified algorithm used in the CT system. For example, there is no visible difference in terms of image contrast, low contrast resolution, tissue morphology, resolution, and noise level, and there is no visible artifact. However, compared with the existing algorithm, the method in this application can simplify calculation complexity and doesn't rely on simulation of system attributes and measurement of a specified scattered signal by scanning a representative phantom under different scanning conditions. Therefore, the method in this application has better robustness.

In addition, the foregoing method in this application may be implemented in a program manner. The program may be stored in a storage medium, and a computer may read the program from the storage medium, and execute the program to implement the foregoing method.

The technology proposed in this application has at least the following technical effects:

1. Novel data training is proposed in this specification, that is, both input data and output data of a learning model are obtained from actual system measurement. By comparison, the learning model is trained based on simulated data in most current studies.

2. In this application, a learning method or a convolutional neural network (CNN) may not be completely used as a "black box" for entire scatter correction. For example, in the technology of this application, theoretical scattered radiation can be calculated by using a physical model in a data preprocessing process, so that a learning model such as the CNN is only used to learn distribution of generated scattered radiation.

3. The technology proposed in this application is not related to a separate system. The trained model is applicable to all systems with the same pattern type or configuration and therefore does not need to be adjusted during manufacturing.

4. The technology in this application is totally based on raw data, and the image of the object does not need to be scanned in the data processing process. Therefore, this does not affect the structure of the current data processing pipeline, and all other calibration or correction steps remain the same.

5. The technology in this application proposes a framework for performing scatter correction by using a learning method, and does not limit which learning technology to use. Machine learning with different network types and deep learning can be used in the framework proposed herein.

Apparently, the described embodiments are only some embodiments rather than all the embodiments of this application. All other embodiments used by a person of ordinary skill in the art based on the embodiments of this application without creative efforts shall fall within the protection scope of this application.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

It should be noted that, in the specification, claims, and accompanying drawings of this application, the terms "first", "second", and so on are intended to distinguish between similar objects but do not necessarily describe a specific order or sequence. It is to be understood that data used in this way is exchangeable in a proper case, so that the embodiments of this application described herein can be implemented in an order different from the order shown or described herein.

The various components described herein may be referred to as "modules", "units", or "devices." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units or devices, as applicable and relevant, may alternatively be referred to herein as "circuitry," "controllers," "processors," or "processing circuitry," or alternatively as noted herein.

The foregoing are merely preferred embodiments of this application and are not intended to limit this application. For a person skilled in the art, this application may have various modifications and changes. Any modification, equivalent replacement, improvement and the like made without departing from the spirit and principle of this application shall fall within the protection scope of this application.

What is claimed is:

1. A method for predicting a scattered signal of an X-ray for an examination object, the method comprising:

scanning, by a first obtaining module, each phantom in a scanning manner in which a scattering degree of each phantom in a plurality of phantoms is less than a reference scattering degree, so as to obtain first projection data of each phantom, wherein the scanning of each phantom comprises:

performing segmented scanning on each of the plurality of phantoms with a first width less than a reference scanning width under a plurality of different scanning conditions to collect projection data of each first segment of each phantom with the first width under each scanning condition, wherein the reference scanning width is a width used when standard clinical scanning is performed; and obtaining the first projection data of each phantom under each scanning condition by connecting the projection data of each first segment of each phantom collected under each scanning condition;

scanning, by a second obtaining module, each phantom in a scanning manner in which the scattering degree of each phantom in the plurality of phantoms is equal to the reference scattering degree, so as to obtain second projection data of each phantom;

obtaining a real scattered signal of each phantom by subtracting, by a subtraction module, the first projection data of the phantom from the second projection data of the phantom;

training, by a training module, a learning model based on the second projection data of each phantom and the real scattered signal of each phantom to obtain a trained learning model, wherein the training comprises:

performing pre-calculation processing on the second projection data of each phantom based on a physical model to obtain a calculated scattered signal of each phantom; and training the learning model by using the calculated scattered signal of each phantom and the real scattered signal of each phantom as training data; and applying, by a prediction module, the trained learning model to projection data of the X-ray for the examination object to predict the scattered signal in the projection data of the X-ray.

2. The method according to claim 1, wherein the calculated scattered signal of each phantom is used as input training data of the learning model, and the real scattered signal of each phantom is used as output training data of the learning model to train the learning model.

3. The method according to claim 1, wherein the scanning of each phantom in a scanning manner in which the scattering degree of each phantom in the plurality of phantoms is equal to the reference scattering degree, so as to obtain second projection data of each phantom comprises:

scanning each of the plurality of phantoms with the reference scanning width under the plurality of different scanning conditions to collect the second projection data of each phantom under each scanning condition.

4. The method according to claim 3, wherein the first projection data of each phantom and the second projection data of each phantom refer to distribution of absorption coefficients collected from each phantom.

5. The method according to claim 1, wherein the physical model is $\delta = \gamma \cdot T_0 \cdot \exp(-\kappa \cdot T)$, $\delta$ is the calculated scattered signal, T is a total absorption coefficient on the entire X-ray scanning path, $T_0$ is an absorption coefficient of each phantom, and $\kappa$ and $\gamma$ are model fitting parameters.

6. The method according to claim 1, wherein the learning model comprises machine learning with different network types and deep learning.

7. The method according to claim 1, wherein the plurality of different scanning conditions comprise one or more of different phantom fading structures, different phantom positions, and different scanning powers.

8. An apparatus for predicting a scattered signal of an X-ray for an examination object, the apparatus comprising:

a first obtaining module, operable to scan each phantom in a scanning manner in which a scattering degree of each phantom in a plurality of phantoms is less than a reference scattering degree, so as to obtain first projection data of each phantom, wherein the scanning of each phantom comprises:

performing segmented scanning on each of the plurality of phantoms with a first width less than a reference scanning width under a plurality of different scanning conditions to collect projection data of each first segment of each phantom with the first width under each scanning condition, wherein the reference scanning width is a width used when standard clinical scanning is performed; and obtaining the first projection data of each phantom under each scanning condition by connecting the projection data of each first segment of each phantom collected under each scanning condition;

a second obtaining module, operable to scan each phantom in a scanning manner in which the scattering degree of each phantom in the plurality of phantoms is equal to the reference scattering degree, so as to obtain second projection data of each phantom;

a subtraction module, operable to obtain a real scattered signal of each phantom by subtracting the first projection data of the phantom from the second projection data of the phantom;

a training module, operable to train a learning model based on the second projection data of each phantom and the real scattered signal of each phantom to obtain a trained learning model, wherein the training comprises:

performing pre-calculation processing on the second projection data of each phantom based on a physical model to obtain a calculated scattered signal of each phantom; and training the learning model by using the calculated scattered signal of each phantom and the real scattered signal of each phantom as training data; and a prediction module, operable to apply the trained learning model to projection data of the X-ray for the examination object to predict the scattered signal in the projection data of the X-ray.

9. A method for correcting a scattered beam of an X-ray for an examination object, the method comprising:

scanning, by a first obtaining module, each phantom in a scanning manner in which a scattering degree of each phantom in a plurality of phantoms is less than a reference scattering degree, so as to obtain first projection data of each phantom, wherein the scanning of each phantom comprises:

performing segmented scanning on each of the plurality of phantoms with a first width less than a reference scanning width under a plurality of different scanning conditions to collect projection data of each first segment of each phantom with the first width under each scanning condition, wherein the reference scanning width is a width used when standard clinical scanning is performed; and obtaining the first projection data of each phantom under each scanning condition by connecting the projection data of each first segment of each phantom collected under each scanning condition;

scanning, by a second obtaining module, each phantom in a scanning manner in which the scattering degree of each phantom in the plurality of phantoms is equal to the reference scattering degree, so as to obtain second projection data of each phantom;

obtaining, by a subtraction module, a real scattered signal of each phantom by subtracting the first projection data of the phantom from the second projection data of the phantom;

training, by a training module, a learning model based on the second projection data of each phantom and the real scattered signal of each phantom to obtain a trained learning model, wherein the training comprises:

performing pre-calculation processing on the second projection data of each phantom based on a physical model to obtain a calculated scattered signal of each phantom; and training the learning model by using the calculated scattered signal of each phantom and the real scattered signal of each phantom as training data;

applying, by a prediction module, the trained learning model to projection data of the X-ray for the examination object to predict the scattered signal in the projection data of the X-ray; and correcting the projection data of the X-ray for the examination object by using the predicted scattered signal to generate scatter-corrected projection data.

10. A method for reconstructing an image of an X-ray for an examination object, the method comprising:

scanning, by a first obtaining module, each phantom in a scanning manner in which a scattering degree of each phantom in a plurality of phantoms is less than a reference scattering degree, so as to obtain first projection data of each phantom, wherein the scanning of each phantom comprises:

performing segmented scanning on each of the plurality of phantoms with a first width less than a reference scanning width under a plurality of different scanning conditions to collect projection data of each first segment of each phantom with the first width under each scanning condition, wherein the reference scanning width is a width used when standard clinical scanning is performed; and obtaining the first projection data of each phantom under each scanning condition by connecting the projection data of each first segment of each phantom collected under each scanning condition;

scanning, by a second obtaining module, each phantom in a scanning manner in which the scattering degree of each phantom in the plurality of phantoms is equal to the reference scattering degree, so as to obtain second projection data of each phantom;

obtaining, by a subtraction module, a real scattered signal of each phantom by subtracting the first projection data of the phantom from the second projection data of the phantom;

training, by a training module, a learning model based on the second projection data of each phantom and the real scattered signal of each phantom to obtain a trained learning model, wherein the training comprises:

performing pre-calculation processing on the second projection data of each phantom based on a physical model to obtain a calculated scattered signal of each phantom; and training the learning model by using the calculated scattered signal of each phantom and the real scattered signal of each phantom as training data;

applying, by a prediction module, the trained learning model to projection data of the X-ray for the examination object to predict the scattered signal in the projection data of the X-ray;

correcting the projection data of the X-ray for the examination object by using the predicted scattered signal to generate scatter-corrected projection data; and reconstructing the scatter-corrected projection data to generate a reconstructed computerized tomography image after scatter correction.

11. A non-transitory computer-readable storage medium storing a program that, when executed, causes a computer to perform the method according to claim 1.

* * * * *